Figure 1:
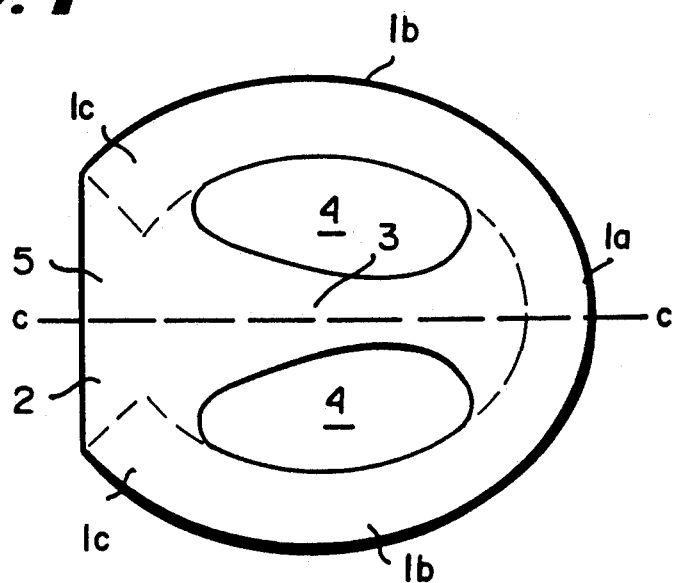

United States Patent [19]
Eriksson

[11] Patent Number: 5,287,931
[45] Date of Patent: Feb. 22, 1994

[54] HORSESHOE

[76] Inventor: Bjorn H. Eriksson, Valla Himmeta, S-731 96 Koping, Sweden

[21] Appl. No.: 910,285
[22] PCT Filed: Nov. 30, 1990
[86] PCT No.: PCT/SE90/00795
 § 371 Date: Jul. 15, 1992
 § 102(e) Date: Jul. 15, 1992
[87] PCT Pub. No.: WO91/07873
 PCT Pub. Date: Jun. 13, 1991

[30] Foreign Application Priority Data
 Dec. 4, 1989 [SE] Sweden .................. 8904088.5
[51] Int. Cl.$^5$ ............................................. A01L 1/02
[52] U.S. Cl. .................................................. 168/24
[58] Field of Search ............... 168/4, 11, 24, DIG. 1, 168/18

[56] References Cited

U.S. PATENT DOCUMENTS

| | | | |
|---|---|---|---|
| 654,711 | 7/1900 | Carman | 168/24 |
| 786,763 | 4/1905 | Hill | 168/11 |
| 808,436 | 12/1905 | Cole | 168/15 |
| 1,274,483 | 8/1918 | Wiesenberg | 168/18 |
| 4,185,695 | 1/1980 | Hancock | 168/18 |

FOREIGN PATENT DOCUMENTS

| | | | |
|---|---|---|---|
| 581182 | 7/1933 | Fed. Rep. of Germany | 168/18 |
| 753859 | 10/1933 | France | 168/4 |

Primary Examiner—Robert P. Swiatek
Attorney, Agent, or Firm—Nixon & Vanderhye

[57] ABSTRACT

A horseshoe includes a curved part (1a), (1b), (1c) intended to cover from below, in the usual horseshoe manner, the support rim of a hoof upon which the shoe is applied. The shoe is formed of a toe portion (1a) and on either side thereof a side portion (1b) and a tract portion (1c), the shoe further having a transverse portion (2), extending between and secured to the two tract portions (1c), and a longitudinal portion (3) located essentially centrally of the shoe in the longitudinal direction (C—C) thereof and extending between the toe portion of the shoe and the transverse portion, the portions being so arranged and dimensioned that they leave openings (4) between themselves on either side of the longitudinal portion. The portions (1a–c, 2, 3) of the shoe form together an integral material body in one piece.

4 Claims, 1 Drawing Sheet

HORSESHOE

This invention relates to a horseshoe. The object of the invention has been to provide a heavy load shoe which offers as to its design and function the support, protection and cooperation which all the mechanisms of the hoof should be offered; outdoors, indoors, summer and winter.

To this end the horseshoe according to the invention includes a plurality of sub-portions in accordance with the disclosure in the opening section of the accompanying claim 1, and according to the invention these portions are arranged as disclosed in the characterizing clause of said claim. In subclaims advantageous detail designs within the scope of claim 1 are disclosed.

Horseshoes, which besides the usual "horseshoe form portions" have portions located as defined in the opening section of claim 1, are known from U.S. Ser. Nos. 786,763 and 808,436. Said first mentioned specification relates to a horseshoe having longitudinal and transverse portions intended to hold and carry a releasable calk device, and the last mentioned specification relates to a shoe having tract portions pivotally secured to side portions of the shoe, said tract portions being resiliently held by longitudinal and transverse portions. Per se, these known designs have thus nothing in common with the invention.

Extensive tests, and shoe wear images showing the cooperation hoof/shoe obtained at such tests, have shown that when employing the shoe according to invention in extremely hard foot work the hoof will be loaded in a way which is very much more favourable to the hoof than if correspondingly loaded while using horseshoe designs for the same purpose, hitherto known.

Figure 2:
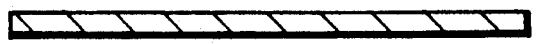
Figure 3:
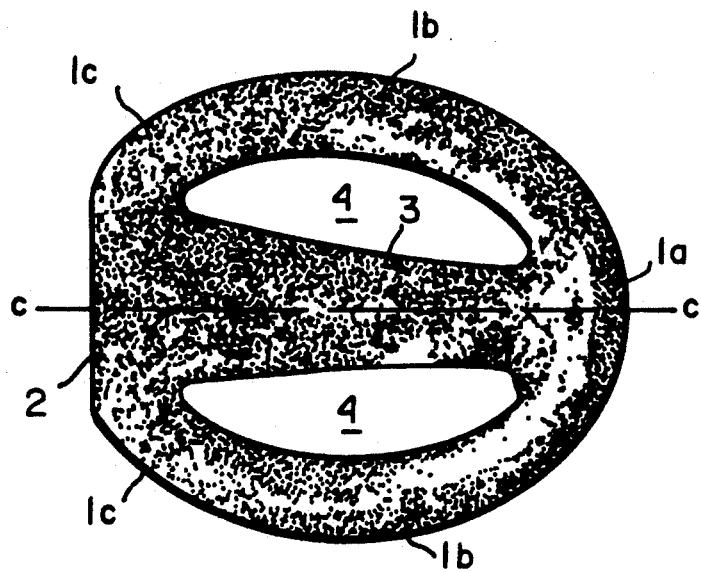

The general design of the horseshoe according to the invention will become apparent from the following description thereof when considered together with the accompanying drawings in which FIG. 1 shows a plan view of a shoe, FIG. 2 shows the same shoe in a cross section along line C—C in FIG. 1, and FIG. 3 is a photo of the surface, facing the hoof, of a shoe according to the invention after having been used, to a certain extent, under heavy load.

In a principal embodiment in accordance with the invention the shoe has essentially plane-parallel top and bottom sides (FIG. 2). It can thus be cut or punched from a plate having a thickness adjusted to the size of the shoe in its plane of treading and to the properties of material, the thickness usually being of the order of between 3 and 7 mm, but of course the shoe can also be cast to shape.

As shown in FIGS. 1 and 3 the shoe is of the kind which has a curved part which covers from below, in use of the shoe, the supporting rim of the hoof along the toe part thereof and the side and tract portions located on either side of that toe part. In FIG. 1 the corresponding portions of the shoe are indicated by dashed lines. As already seen from the reference above to claim 1 there is between the two tract portions 1c a cross portion 2 extending essentially at right angles to the longitudinal direction C—C of the shoe, in addition to which a longitudinal portion 3 located essentially centrally extends in a longitudinal direction of the shoe, between the toe portion 1a and the cross portion 2.

Between the side portions 1b and the transverse and longitudinal portions 2 and 3, respectively, there are thus openings 4 on either side of the longitudinal portion, through which openings the radius groove is accessible for cleaning and clay packing.

The hoof radius will receive indirect ground contact through the medium of the substantially T-shaped shoe portion, according to the invention integral with the remaining portions of the shoe, which T-portion the transverse and longitudinal portions 2 and 3, respectively, form together. Said contact takes place in a manner thoroughly improving the supporting capacity of the shoe in comparison with shoes which cover essentially only the supporting rim of the hoof. Hereby formation of bolus and a narrow tract hoof is prevented.

In order to offer in a shoe according to the invention the best possible support surface on the shoe within the area between the tract portions 1c of the curved part, it is advisable that the longitudinal portion 3, in a manner as illustrated in FIGS. 1 and 3, has a continuously growing width in the rearward direction of the shoe, so that there is formed at the back of the shoe a support surface 5 located centrally between the two tract portions 1c of the curved part of the hoof, which support surface prevents the tract angles from being permanently pressed together to create a narrow tract.

As a matter of course and for normal reasons of strength, the transition sections between those portions of the shoe into which, in order to facilitate disclosure of its construction, the shoe has been divided here should be smooth ("fillets"). For this reason it is but natural that also the "borders" of these portions are more or less diffuse.

A shoe made in accordance with the invention can and preferably should be secured to the hoof by a comparatively small number of nails, which are provided only in the toe and in the front part of the side portions and in nail holes which have clearance for the nail only in the transverse direction of the shoe, so that the support rim of the hoof will obtain the necessary freedom of movement under load.

From the wear pattern in FIG. 3 it is seen that the tract areas of the hoof have been spared from stress and strain causing compression of the tract angles.

Choosing material for the shoe according to the invention is an utmost important task. It is essential that the shoe is capable of withstanding all the stress occurring at the maximum shoe load to be expected in the intended use of the shoe, without the shoe being permanently deformed in any of its parts which are loaded in the plane of the hoof. Hence, in shoes according to the present invention it is impossible to use common horse shoe steel of the kind used for shoes which are to be adjusted to the shape of the hoof by deformation. Materials particularly suitable, not the least in view of weight, are e.g. certain high-quality aluminium alloys. Such a suitable aluminium alloy is SS42-45 which has proved to afford to shoes of the design shown in FIG. 3 the properties desired in connection with the invention with respect to shape permanence in stress, or the ability to recover original form after stresses of the kind highly loaded horse shoes can be exposed to. Guided by the demands made here upon the material properties the man of the art could select other suitable materials among "composite materials" of various species, for example, on the basis of carbon or other fibres.

I claim:

1. A horseshoe for covering the entire rim of a horse's hoof comprising:

an integral unitary body having a longitudinally extending centerline and a continuous curved part sized to underlie the entire support rim of the hoof, said curved part being formed of a forward toe portion, two arcuate side portions spaced from one another and extending rearwardly from said toe portion on opposite sides of said centerline in the longitudinal direction of the shoe and a pair of tract portions located rearwardly of said side portions, respectively, and underlying corresponding tract portions of the hoof when the horseshoe is attached to the hoof;

said body including a transverse portion located between said tract portions of said body and extending substantially at right angles to the longitudinal centerline of said body, and a longitudinally extending portion between said toe portion and said transverse portion, said transverse portion and said longitudinally extending portion substantially straddling said centerline, said curved part, said transverse portion and said longitudinally extending portion being configured and dimensioned to define no more than two openings passing through the horseshoe body on opposite sides of said centerline, with one opening disposed on each side of said centerline, thereby affording access from a bottom of said horseshoe body through the shoe to an area between the shoe and the horn sole of the hoof when the horseshoe is attached to the hoof, the bottom surface of said longitudinally extending portion being substantially coplanar with the bottom surfaces of said curved part and said transverse portion and said longitudinally extending portion increasing in width from front to rear along its entire length.

2. A horseshoe according to claim 1 wherein said longitudinally extending portion has at the back of said horseshoe a support surface located centrally between said pair of tract portions of said curved part.

3. A horseshoe according to claim 2 wherein the top and bottom sides of said horseshoe extend along planes substantially parallel to one another.

4. A horseshoe according to claim 1 wherein the top and bottom sides of said horseshoe extend along planes substantially parallel to one another.

* * * * *